(12) United States Patent
Lin et al.

(10) Patent No.: US 11,029,908 B2
(45) Date of Patent: Jun. 8, 2021

(54) HEAD MOUNTED DISPLAY APPARATUS

(71) Applicant: Himax Display, Inc., Tainan (TW)

(72) Inventors: Chi-Wen Lin, Tainan (TW); Wen-Hsu Chen, Tainan (TW); Yuet-Wing Li, Tainan (TW); Kuan-Hsu Fan Chiang, Tainan (TW)

(73) Assignee: Himax Display, Inc., Tainan (TW)

( * ) Notice: Subject to any disclaimer, the term of this patent is extended or adjusted under 35 U.S.C. 154(b) by 0 days.

(21) Appl. No.: 16/553,196

(22) Filed: Aug. 28, 2019

(65) Prior Publication Data

US 2021/0064320 A1 Mar. 4, 2021

(51) Int. Cl.
*G06F 3/14* (2006.01)
*G06F 3/01* (2006.01)

(52) U.S. Cl.
CPC ............ *G06F 3/1423* (2013.01); *G06F 3/011* (2013.01)

(58) Field of Classification Search
CPC ................................ G06F 3/1423; G06F 3/011
See application file for complete search history.

(56) References Cited

U.S. PATENT DOCUMENTS

| | | | | |
|---|---|---|---|---|
| 5,291,294 A * | 3/1994 | Hirota | ................ | H04N 5/37213 348/316 |
| 8,134,671 B2 * | 3/2012 | Takeda | .................. | G02F 1/1393 349/139 |
| 8,310,614 B2 * | 11/2012 | Sasaki | ....................... | G09F 9/35 349/56 |
| 9,007,532 B2 * | 4/2015 | Rumreich | ............ | H04N 9/3129 348/744 |
| 9,298,041 B2 * | 3/2016 | Escuti | .................. | G02B 5/3083 |
| 10,417,975 B2 * | 9/2019 | Tardif | .................... | G09G 3/025 |
| 10,613,326 B2 * | 4/2020 | Kikuchi | ................... | G02B 5/08 |
| 2009/0021801 A1 * | 1/2009 | Ishihara | ................. | G02B 27/48 358/475 |
| 2009/0128780 A1 * | 5/2009 | Schuck | ................... | G02B 30/24 353/20 |
| 2010/0033791 A1 * | 2/2010 | Nakanishi | ............ | G02B 27/017 359/204.2 |
| 2010/0039596 A1 * | 2/2010 | Shin | .................. | G02F 1/133711 349/124 |
| 2010/0103077 A1 * | 4/2010 | Sugiyama | .......... | G02B 27/0172 345/8 |
| 2011/0043717 A1 * | 2/2011 | Valyukh | ................... | G02F 1/29 349/33 |

(Continued)

*Primary Examiner* — Grant Sitta
(74) *Attorney, Agent, or Firm* — CKC & Partners Co., LLC (57) ABSTRACT

A head mounted display (HMD) apparatus is provided. The HMD apparatus includes a first lens, a second lens, a first micro-display disposed on the first lens, a second micro-display disposed on the second lens, a first light source, a second light source, and an eyeglass frame. A first side of the first micro-display corresponding to a first rubbing alignment processing direction and a first side of the second micro-display corresponding to a second rubbing alignment processing direction are symmetric with respect to a center line of the eyeglass frame between the first lens and the second lens. A first incident light emitted by the first light source is obliquely emitted from the first side of the first micro-display toward the first micro-display and a second incident light emitted by the second light source is obliquely emitted from the first side of the second micro-display toward the second micro-display.

10 Claims, 4 Drawing Sheets

(56) References Cited

U.S. PATENT DOCUMENTS

| | | | |
|---|---|---|---|
| 2012/0075562 A1* | 3/2012 | Yeh | G02F 1/136286 |
| | | | 349/139 |
| 2012/0188148 A1* | 7/2012 | DeJong | G02B 27/017 |
| | | | 345/8 |
| 2013/0100367 A1* | 4/2013 | Takahashi | G02B 5/305 |
| | | | 349/15 |
| 2013/0107173 A1* | 5/2013 | Takeda | G02B 5/23 |
| | | | 349/96 |
| 2014/0176856 A1* | 6/2014 | Lee | G09F 9/301 |
| | | | 349/61 |
| 2015/0055063 A1* | 2/2015 | Hsieh | G02F 1/133753 |
| | | | 349/99 |
| 2015/0116625 A1* | 4/2015 | Hwang | G02F 1/136209 |
| | | | 349/57 |
| 2015/0160509 A1* | 6/2015 | Lee | G02F 1/1341 |
| | | | 349/42 |
| 2016/0041431 A1* | 2/2016 | Suzuki | G02F 1/133707 |
| | | | 349/110 |
| 2016/0097954 A1* | 4/2016 | Lee | G02F 1/133711 |
| | | | 349/124 |
| 2016/0252726 A1* | 9/2016 | Ishida | G02B 26/101 |
| | | | 345/8 |
| 2018/0088417 A1* | 3/2018 | An | G02F 1/133784 |
| 2018/0107056 A1* | 4/2018 | Park | G02B 3/14 |
| 2019/0086670 A1* | 3/2019 | Ishida | H01S 5/0071 |
| 2020/0018962 A1* | 1/2020 | Lu | G02B 27/0172 |
| 2020/0049996 A1* | 2/2020 | Yan | G02F 1/13306 |
| 2020/0113413 A1* | 4/2020 | Hayashi | A61B 1/045 |

\* cited by examiner

HEAD MOUNTED DISPLAY APPARATUS

BACKGROUND

Field of Invention

The present invention relates to a head mounted display (HMD) apparatus. More particularly, the present invention relates to a head mounted display (HMD) apparatus for improving an image quality of the left eye and the right eye.

Description of Related Art

Head mounted display (HMD) is an optical display product which places two identical micro-displays respectively in front of left eye and right eye. The HMD further includes two light sources, one light source is used for emitting an incident light toward one of the micro-displays, and the other light source is used for emitting an incident light toward the other of the micro-displays. However, because two micro-displays are identical, and the incident lights are obliquely incident, an image quality (such as brightness, contrast, etc.) of the left eye and the right eye may be inconsistent.

SUMMARY

The present invention provides a head mounted display (HMD) apparatus including a first lens, a second lens, a first micro-display disposed on the first lens, a second micro-display disposed on the second lens, a first light source for emitting a first incident light, a second light source for emitting a second incident light, and an eyeglass frame for carrying the first lens, the second lens, the first light source, and the second light source. A first rubbing alignment processing direction of the first micro-display is symmetric to a second rubbing alignment processing direction of the second micro-display, such that a first side of the first micro-display corresponding to the first rubbing alignment processing direction and a first side of the second micro-display corresponding to the second rubbing alignment processing direction are symmetric with respect to a center line of the eyeglass frame between the first lens and the second lens. The first incident light emitted by the first light source is obliquely emitted from the first side of the first micro-display toward the first micro-display and the second incident light emitted by the second light source is obliquely emitted from the first side of the second micro-display toward the second micro-display.

In accordance with one or more embodiments of the invention, a difference between the first rubbing alignment processing direction of the first micro-display and the second rubbing alignment processing direction of the second micro-display are 180 degrees.

In accordance with one or more embodiments of the invention, a first disposed direction of the first micro-display is the same as a second disposed direction of the second micro-display.

The present invention also provides a head mounted display (HMD) apparatus including a first lens, a second lens, a first micro-display disposed on the first lens, a second micro-display disposed on the second lens, a first light source for emitting a first incident light, a second light source for emitting a second incident light, and an eyeglass frame for carrying the first lens, the second lens, the first light source, and the second light source. A first disposed direction of the first micro-display is upside-down to a second disposed direction of the second micro-display, such that a first side of the first micro-display corresponding a first rubbing alignment processing direction and a first side of the second micro-display corresponding a second rubbing alignment processing direction are symmetric with respect to a center line of the eyeglass frame between the first lens and the second lens. The first incident light emitted by the first light source is obliquely emitted from the first side of the first micro-display toward the first micro-display and the second incident light emitted by the second light source is obliquely emitted from the first side of the second micro-display toward the second micro-display.

In accordance with one or more embodiments of the invention, a first data scanning direction of the first micro-display is opposite to a second data scanning direction of the second micro-display.

In accordance with one or more embodiments of the invention, the first rubbing alignment processing direction of the first micro-display is same as the second rubbing alignment processing direction of the second micro-display.

The present invention further provides a head mounted display (HMD) apparatus including a first lens, a second lens, a first micro-display disposed on the first lens, a second micro-display disposed on the second lens, a first light source for emitting a first incident light, a second light source for emitting a second incident light, and an eyeglass frame for carrying the first lens and the second lens. A first rubbing alignment processing direction of the first micro-display is same as a second rubbing alignment processing direction of the second micro-display, such that a first side of the first micro-display corresponding to the first rubbing alignment processing direction and a second side of the second micro-display corresponding to the second rubbing alignment processing direction are symmetric with respect to a center line of the eyeglass frame between the first lens and the second lens. The first incident light emitted by the first light source is obliquely emitted from the first side of the first micro-display toward the first micro-display and the second incident light emitted by the second light source is obliquely emitted from a first side of the second micro-display toward the second micro-display, wherein the first side and the second side of the second micro-display are opposite to each other.

In accordance with one or more embodiments of the invention, a first disposed direction of the first micro-display is the same as a second disposed direction of the second micro-display.

In accordance with one or more embodiments of the invention, the eyeglass frame is used for carrying the first light source and the second light source, wherein the second incident light emitted by the second light source is guided through a light guide component, such that the incident light emitted by the second light source may be obliquely emitted from the first side of the second micro-display toward the second micro-display.

In accordance with one or more embodiments of the invention, the second light source is disposed to be combined with the second micro-display, such that the incident light emitted by the second light source may be obliquely emitted from the first side of the second micro-display toward the second micro-display.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size. The using of "first", "second", "third", etc. in the specification should be understood for identify units or data described by the same terminology, but are not referred to particular order or sequence.

Figure 1:
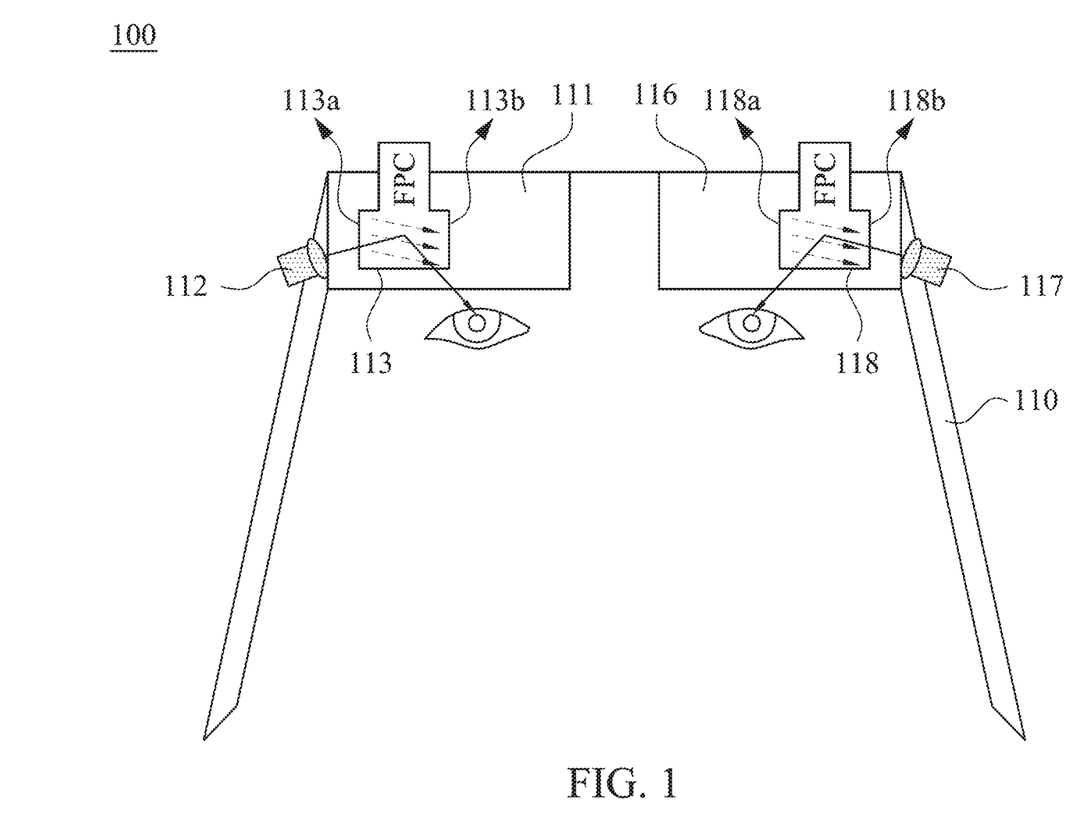
FIG. 1 illustrates an exemplary head mounted display (HMD) apparatus 100 to illustrate inconsistent image quality of the left eye and the right eye.

FIG. 1 illustrates an exemplary head mounted display (HMD) apparatus 100 to illustrate inconsistent image quality of the left eye and the right eye. The HMD apparatus 100 includes an eyeglass frame 110, a left lens 111, a left light source 112, a left micro-display 113, a right lens 116, a right light source 117, and a right micro-display 118. The eyeglass frame 110 is used for carrying the left lens 111, the right lens 116, the left light source 112, and the right light source 117. The left micro-display 113 is disposed on the left lens 111 and the right micro-display 118 is disposed on the right lens 116. As shown in FIG. 1, a disposed direction of the left micro-display 113 is the same as a disposed direction of the right micro-display 118. As shown in FIG. 1, each of the left micro-display 113 and the right micro-display 118 further includes a flexible printed circuit (FPC) for conveying signals.

The left micro-display 113 has a first side 113a and a second side 113b corresponding to a rubbing alignment processing direction of the left micro-display 113, the right micro-display 118 has a first side 118a and a second side 118b corresponding to a rubbing alignment processing direction of the right micro-display 118. Generally, the left micro-display 113 and the right micro-display 118 are substantially the same micro-displays which are made by the same manufacture processes, thereby having the same rubbing alignment processing directions. Therefore, the first side 113a of the left micro-display 113 corresponds to the first side 118a of the right micro-display 118, and the second side 113b of the left micro-display 113 corresponds to the second side 118b of the right micro-display 118.

As shown in FIG. 1, the left light source 112 obliquely emits an incident light from the first side 113a of the left micro-display 113 toward the left micro-display 113, but the right light source 117 obliquely emits an incident light from the second side 118b of the right micro-display 118 toward the right micro-display 118. Specifically, two incident lights are respectively emitted from different side of its corresponding micro-display, and thus an image quality (such as brightness, contrast, etc.) of the left eye and the right eye may be inconsistent.

Figure 2:
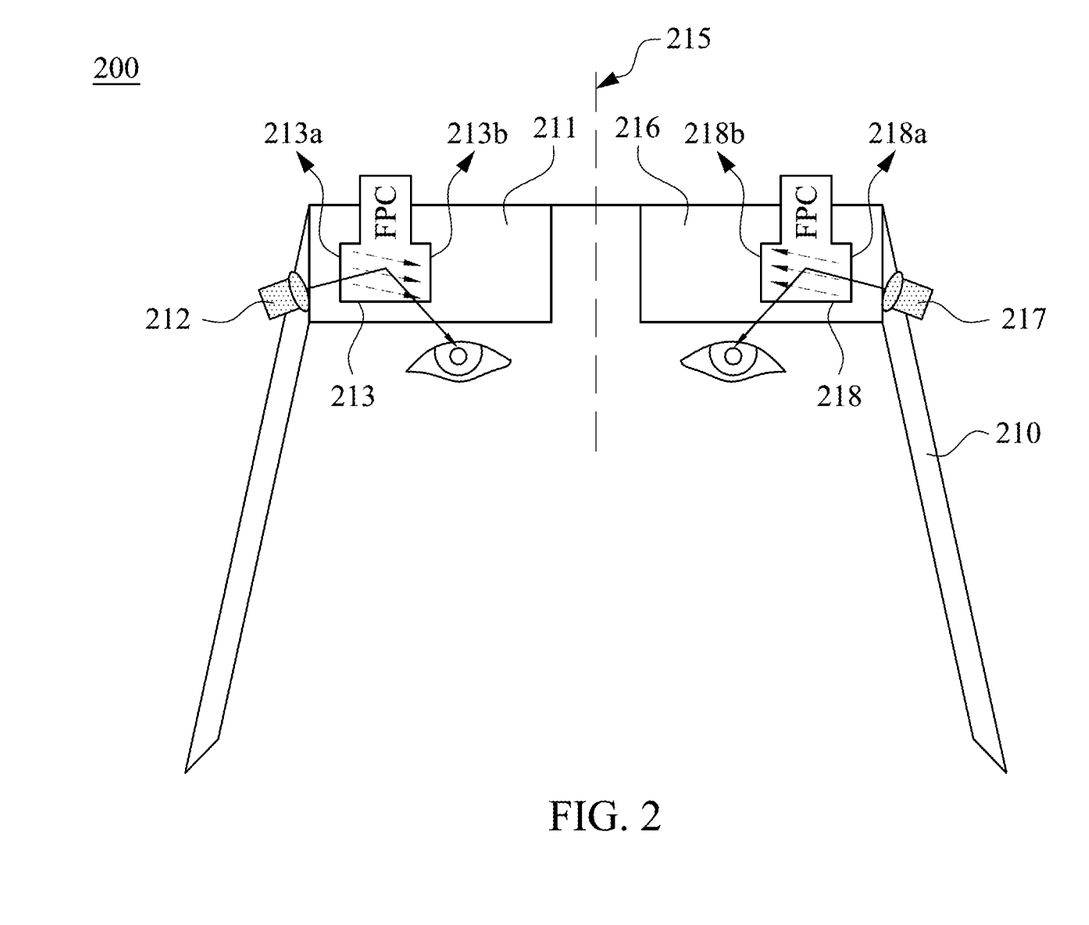
FIG. 2 illustrates a head mounted display (HMD) apparatus according to a first embodiment of the present invention.

FIG. 2 illustrates a head mounted display (HMD) apparatus 200 according to a first embodiment of the present invention. The HMD apparatus 200 includes an eyeglass frame 210, a left lens 211, a left light source 212, a left micro-display 213, a right lens 216, a right light source 217, and a right micro-display 218. The eyeglass frame 210 is used for carrying the left lens 211, the right lens 216, the left light source 212, and the right light source 217. The left micro-display 213 is disposed on the left lens 211 and the right micro-display 218 is disposed on the right lens 216. As shown in FIG. 2, a disposed direction of the left micro-display 213 is the same as a disposed direction of the right micro-display 218. As shown in FIG. 2, each of the left micro-display 213 and the right micro-display 218 further includes a flexible printed circuit (FPC) for conveying signals.

The left micro-display 213 has a first side 213a and a second side 213b corresponding to a rubbing alignment processing direction of the left micro-display 213, the right micro-display 218 has a first side 218a and a second side 218b corresponding to a rubbing alignment processing direction of the right micro-display 218. In the first embodiment of the present invention, the left micro-display 213 and the right micro-display 218 are made by different manufacture processes (i.e., symmetric manufacture processes), such that the rubbing alignment processing direction of the left micro-display 213 is symmetric to the rubbing alignment processing direction of the right micro-display 218. For example, a difference between the rubbing alignment processing direction of the left micro-display 213 and the rubbing alignment processing direction of the right micro-display 218 are substantially 180 degrees or approximately 180 degrees. Therefore, the first side 213a of the left micro-display 213 corresponds to the first side 218a of the right micro-display 218, and the second side 213b of the left micro-display 213 corresponds to the second side 218b of the right micro-display 218. Specifically, as shown in FIG. 2, the first side 213a of the left micro-display 213 corresponding to the rubbing alignment processing direction of the left micro-display 213 and the first side 218a of the right micro-display 218 corresponding to the rubbing alignment processing direction of the right micro-display 218 are symmetric with respect to a center line 215 of the eyeglass frame 210 between the left lens 211 and the right lens 216.

As shown in FIG. 2, the left light source 212 obliquely emits a first incident light from the first side 213a of the left micro-display 213 toward the left micro-display 213, and the right light source 217 also obliquely emits a second incident light from the first side 218a of the right micro-display 218 toward the right micro-display 218. Specifically, the first incident light and the second incident light are respectively emitted from same side of its corresponding micro-display, and thus the image quality (such as brightness, contrast, etc.) of the left eye and the right eye may be improved and even consistent. It is worth mentioning that, in the first embodiment of the present invention, the image quality of the left eye and the right eye may be optimally improved, when the difference between the rubbing alignment processing direction of the left micro-display 213 and the rubbing alignment processing direction of the right micro-display 218 are 180 degrees. However, the present invention is not limited thereto, the image quality of the left eye and the right eye may be also improved when the difference between the rubbing alignment processing direction of the left micro-display 213 and the rubbing alignment processing direction of the right micro-display 218 are approximately 180 degrees.

Figure 3:
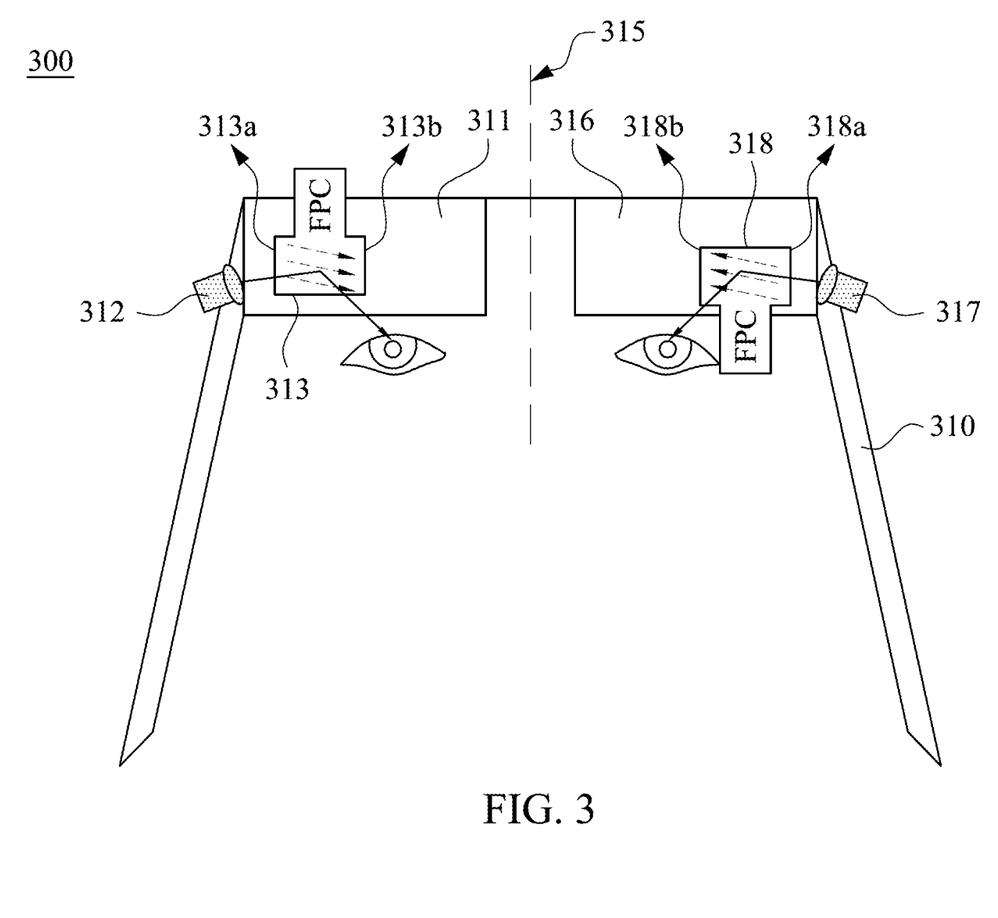
FIG. 3 illustrates a head mounted display (HMD) apparatus according to a second embodiment of the present invention.

FIG. 3 illustrates a head mounted display (HMD) apparatus 300 according to a second embodiment of the present invention. The HMD apparatus 300 includes an eyeglass frame 310, a left lens 311, a left light source 312, a left micro-display 313, a right lens 316, a right light source 317, and a right micro-display 318. The eyeglass frame 310 is used for carrying the left lens 311, the right lens 316, the left light source 312, and the right light source 317. The left micro-display 313 is disposed on the left lens 311 and the right micro-display 318 is disposed on the right lens 316. As shown in FIG. 3, each of the left micro-display 313 and the right micro-display 318 further includes a flexible printed circuit (FPC) for conveying signals.

The left micro-display 313 has a first side 313a and a second side 313b corresponding to a rubbing alignment processing direction of the left micro-display 313, the right micro-display 318 has a first side 318a and a second side 318b corresponding to a rubbing alignment processing direction of the right micro-display 318. In the second embodiment of the present invention, the left micro-display 313 and the right micro-display 318 are substantially the same micro-displays which are made by the same manufacture processes, thereby having the same rubbing alignment processing directions. Therefore, the first side 313a of the left micro-display 313 corresponds to the first side 318a of the right micro-display 318, and the second side 313b of the left micro-display 313 corresponds to the second side 318b of the right micro-display 318. Specifically, as shown in FIG. 3, the first side 313a of the left micro-display 313 corresponding to the rubbing alignment processing direction of the left micro-display 313 and the first side 318a of the right micro-display 318 corresponding to the rubbing alignment processing direction of the right micro-display 318 are symmetric with respect to a center line 315 of the eyeglass frame 310 between the left lens 311 and the right lens 316.

As shown in FIG. 3, a disposed direction of the left micro-display 313 is upside-down to a disposed direction of the right micro-display 318, and thus the left light source 312 obliquely emits a first incident light from the first side 313a of the left micro-display 313 toward the left micro-display 313, and the right light source 317 also obliquely emits a second incident light from the first side 318a of the right micro-display 318 toward the right micro-display 318. Specifically, the first incident light and the second incident light are respectively emitted from same side of its corresponding micro-display, and thus the image quality (such as brightness, contrast, etc.) of the left eye and the right eye may be improved and even consistent. It is noted that, because the disposed direction of the left micro-display 313 is upside-down to the disposed direction of the right micro-display 318, a data scanning direction of the left micro-display 313 needs to be opposite to a data scanning direction of the right micro-display 318, such that the head mounted display (HMD) apparatus 300 may be correctly displayed.

Figure 4:
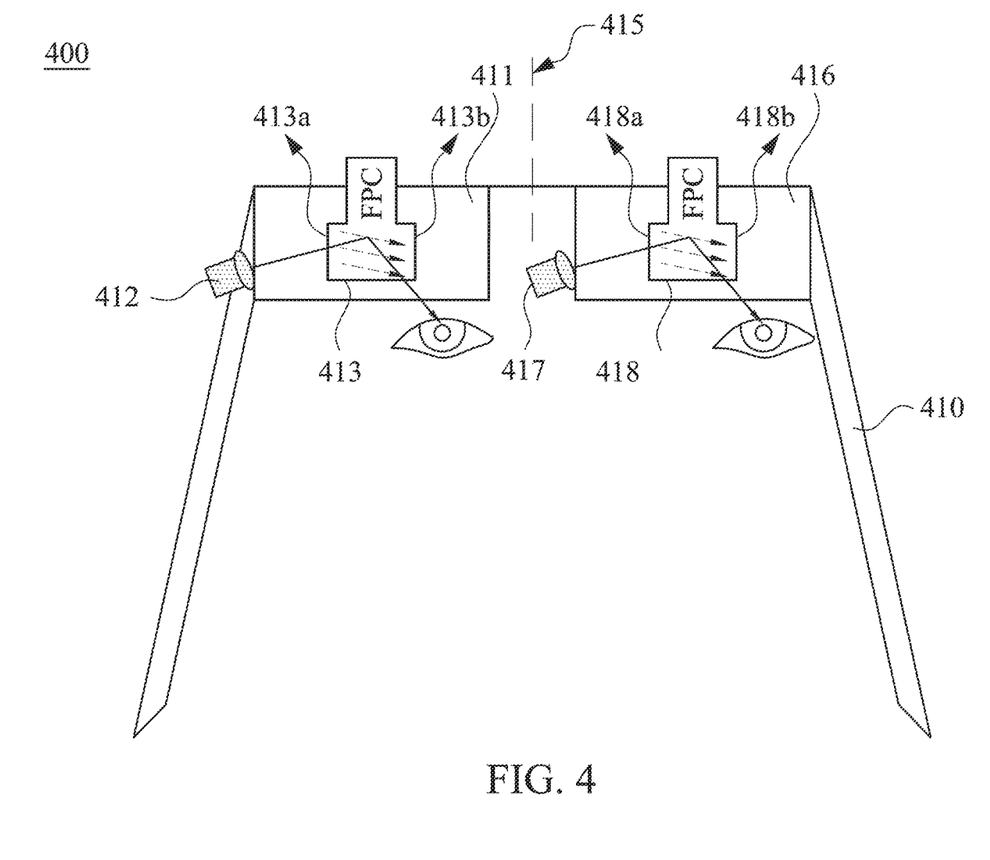
FIG. 4 illustrates a head mounted display (HMD) apparatus according to a third embodiment of the present invention.

FIG. 4 illustrates a head mounted display (HMD) apparatus 400 according to a third embodiment of the present invention. The HMD apparatus 400 includes an eyeglass frame 410, a left lens 411, a left light source 412, a left micro-display 413, a right lens 416, a right light source 417, and a right micro-display 418. The eyeglass frame 410 is used for carrying the left lens 411 and the right lens 416. The left micro-display 413 is disposed on the left lens 411 and the right micro-display 418 is disposed on the right lens 416. As shown in FIG. 4, a disposed direction of the left micro-display 413 is the same as a disposed direction of the right micro-display 418. As shown in FIG. 4, each of the left micro-display 413 and the right micro-display 418 further includes a flexible printed circuit (FPC) for conveying signals.

The left micro-display 413 has a first side 413a and a second side 413b corresponding to a rubbing alignment processing direction of the left micro-display 413, the right micro-display 418 has a first side 418a and a second side 418b corresponding to a rubbing alignment processing direction of the right micro-display 418. In the third embodiment of the present invention, the left micro-display 413 and the right micro-display 418 are substantially the same micro-displays which are made by the same manufacture processes, thereby having the same rubbing alignment processing directions. Therefore, the first side 413a of the left micro-display 413 corresponds to the first side 418a of the right micro-display 418, and the second side 413b of the left micro-display 413 corresponds to the second side 418b of the right micro-display 418. Specifically, as shown in FIG. 4, the first side 413a of the left micro-display 413 corresponding to the rubbing alignment processing direction of the left micro-display 413 and the second side 418b of the right micro-display 418 corresponding to the rubbing alignment processing direction of the right micro-display 418 are different sides and symmetric with respect to a center line 415 of the eyeglass frame 410 between the left lens 411 and the right lens 416.

As shown in FIG. 4, the left light source 412 obliquely emits a first incident light from the first side 413a of the left micro-display 413 toward the left micro-display 413, and the right light source 417 also obliquely emits a second incident light from the first side 418a of the right micro-display 418 toward the right micro-display 418. Specifically, the first incident light and the second incident light are respectively emitted from same side of its corresponding micro-display, and thus the image quality (such as brightness, contrast, etc.) of the left eye and the right eye may be improved and even consistent.

For example, the left light source 412 and the right light source 417 may be carried on the eyeglass frame 410, and the second incident light emitted by the right light source 417 may be guided through a light guide component (e.g., a light guide pipe, a light guide plate, etc.), such that the second incident light emitted by the right light source 417 may be obliquely emitted from the first side 418a of the right micro-display 418 toward the right micro-display 418.

For another example, the left light source 412 may be designed to be directly disposed beside the first side 413a of the left micro-display 413 (i.e., the left light source 412 is disposed to be combined with the left micro-display 413), and the right light source 417 may be designed to be directly disposed beside the first side 418a of the right micro-display 418 (i.e., the right light source 417 is disposed to be combined with the right micro-display 418), such that the second incident light emitted by the right light source 417 may be obliquely emitted from the first side 418a of the right micro-display 418 toward the right micro-display 418.

It is worth mentioning that, in the case that the left light source is disposed to be combined with the left micro-display and the right light source is disposed to be combined with the right micro-display, any of the second embodiment and the third embodiment may be modified accordingly, such that the left light source 212/312 obliquely emits an incident light from the second side 213b/313b of the left micro-display 213/313 toward the left micro-display 213/313, and the right light source 217/317 also obliquely emits an incident light from the second side 218b/318b of the right micro-display 218/318 toward the right micro-display 218/318.

From the above description, several head mounted display (HMD) apparatus of the present invention are designed, such that the incident lights are emitted from the same sides of the micro-displays, and thus the image quality (such as brightness, contrast, etc.) of the left eye and the right eye may be improved and even consistent.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A head mounted display (HMD) apparatus, comprising:
a first lens and a second lens;
a first micro-display disposed on the first lens;
a second micro-display disposed on the second lens;
a first light source for emitting a first incident light;
a second light source for emitting a second incident light; and
an eyeglass frame for carrying the first lens, the second lens, the first light source, and the second light source;
wherein the first micro-display and the second micro-display are made by symmetric manufacturing processes, such that a first rubbing alignment processing direction of the first micro-display is symmetric to a second rubbing alignment processing direction of the second micro-display, such that a first side of the first micro-display corresponding to the first rubbing alignment processing direction and a first side of the second micro-display corresponding to the second rubbing alignment processing direction are symmetric with respect to a center line of the eyeglass frame between the first lens and the second lens;
wherein the first incident light emitted by the first light source is obliquely emitted from the first side of the first micro-display toward the first micro-display and the second incident light emitted by the second light source is obliquely emitted from the first side of the second micro-display toward the second micro-display.

2. The HMD apparatus of claim 1, wherein a difference between the first rubbing alignment processing direction of the first micro-display and the second rubbing alignment processing direction of the second micro-display are 180 degrees.

3. The HMD apparatus of claim 1, wherein a first disposed direction of the first micro-display is the same as a second disposed direction of the second micro-display.

4. A head mounted display (HMD) apparatus, comprising:
a first lens and a second lens;
a first micro-display disposed on the first lens;
a second micro-display disposed on the second lens;
a first light source for emitting a first incident light;
a second light source for emitting a second incident light; and
an eyeglass frame for carrying the first lens, the second lens, the first light source, and the second light source;
wherein a first disposed direction of the first micro-display is upside-down to a second disposed direction of the second micro-display with respect to a center line of the eyeglass frame between the first lens and the second lens, such that a first side of the first micro-display corresponding a first rubbing alignment processing direction and a first side of the second micro-display corresponding a second rubbing alignment processing direction are symmetric with respect to the center line of the eyeglass frame between the first lens and the second lens;
wherein the first incident light emitted by the first light source is obliquely emitted from the first side of the first micro-display toward the first micro-display and the second incident light emitted by the second light source is obliquely emitted from the first side of the second micro-display toward the second micro-display.

5. The HMD apparatus of claim 4, wherein a first data scanning direction of the first micro-display is opposite to a second data scanning direction of the second micro-display.

6. The HMD apparatus of claim 4, wherein the first rubbing alignment processing direction of the first micro-display is same as the second rubbing alignment processing direction of the second micro-display.

7. A head mounted display (HMD) apparatus, comprising:
a first lens and a second lens;
a first micro-display disposed on the first lens;
a second micro-display disposed on the second lens;
a first light source for emitting a first incident light;
a second light source for emitting a second incident light; and
an eyeglass frame for carrying the first lens and the second lens;
wherein the first micro-display and the second micro-display are made by same manufacturing processes, such that a first rubbing alignment processing direction of the first micro-display is same as a second rubbing alignment processing direction of the second micro-display, such that a first side of the first micro-display corresponding to the first rubbing alignment processing direction and a second side of the second micro-display corresponding to the second rubbing alignment processing direction are symmetric with respect to a center line of the eyeglass frame between the first lens and the second lens;
wherein the first incident light emitted by the first light source is obliquely emitted from the first side of the first micro-display toward the first micro-display and the second incident light emitted by the second light source is obliquely emitted from a first side of the second micro-display toward the second micro-display, wherein the first side and the second side of the second micro-display are opposite to each other.

8. The HMD apparatus of claim 7, wherein a first disposed direction of the first micro-display is the same as a second disposed direction of the second micro-display.

9. The HMD apparatus of claim 7, wherein the eyeglass frame is used for carrying the first light source and the second light source, wherein the second incident light emitted by the second light source is guided through a light guide component, such that the second incident light emitted by the second light source may be obliquely emitted from the first side of the second micro-display toward the second micro-display.

10. The HMD apparatus of claim 7, wherein the second light source is disposed to be combined with the second micro-display, such that the second incident light emitted by the second light source may be obliquely emitted from the first side of the second micro-display toward the second micro-display.

\* \* \* \* \*